(12) United States Patent
Pigatti

(10) Patent No.: US 8,196,914 B2
(45) Date of Patent: Jun. 12, 2012

(54) CLAMP FOR A KEY CUTTING MACHINE

(75) Inventor: Giorgio Pigatti, Cordignano (IT)

(73) Assignee: SILCA S.p.A., Vittorio Veneto (IT)

( * ) Notice: Subject to any disclaimer, the term of this patent is extended or adjusted under 35 U.S.C. 154(b) by 412 days.

(21) Appl. No.: 12/312,507

(22) PCT Filed: Nov. 23, 2007

(86) PCT No.: PCT/EP2007/062758
§ 371 (c)(1),
(2), (4) Date: May 14, 2009

(87) PCT Pub. No.: WO2008/065052
PCT Pub. Date: Jun. 5, 2008

(65) Prior Publication Data
US 2010/0059916 A1    Mar. 11, 2010

(30) Foreign Application Priority Data
Nov. 30, 2006  (IT) .............................. VE2006A0075

(51) Int. Cl.
*B25B 1/10* (2006.01)
*B25B 1/12* (2006.01)

(52) U.S. Cl. .................... 269/157; 269/240; 269/254 CS

(58) Field of Classification Search .................. 269/157, 269/160, 162, 224, 240, 257, 285, 164, 254 CS; 81/475
See application file for complete search history.

(56) References Cited

U.S. PATENT DOCUMENTS

| | | | | |
|---|---|---|---|---|
| 1,173,316 A | * | 2/1916 | Segal | 464/39 |
| 2,745,303 A | | 5/1956 | Cornelius | |
| 3,535,958 A | * | 10/1970 | Larson | 81/475 |
| 3,815,209 A | | 6/1974 | Basile | |
| 3,829,077 A | * | 8/1974 | Strybel | 269/224 |
| 4,046,364 A | | 9/1977 | Coope et al. | |
| 4,324,513 A | * | 4/1982 | Hughes | 409/82 |
| 4,709,511 A | | 12/1987 | Camillo | |
| 5,683,077 A | | 11/1997 | Fink | |
| 6,641,339 B2 | | 11/2003 | Chies | |
| 2006/0016300 A1 | | 1/2006 | Bubel | |

FOREIGN PATENT DOCUMENTS

| | | |
|---|---|---|
| DE | 103 41 627 | 4/2005 |
| WO | WO 2005/039810 | 5/2005 |

* cited by examiner

*Primary Examiner* — Hadi Shakeri
(74) *Attorney, Agent, or Firm* — Themis Law

(57) ABSTRACT

A clamp for key cutting machines includes a pair of jaws mounted on a single pin fixed to the machine structure and associated with a knob screwable on a threaded portion of said pin and acting in the sense of causing the jaws to forcedly approach each other, against the elastic reaction of a spring tending to repel them, and to retain a key positioned between them. A clamp according to the invention further includes a friction type overload clutch interposed between the knob and the pin.

7 Claims, 1 Drawing Sheet

CLAMP FOR A KEY CUTTING MACHINE

FIELD OF THE INVENTION

The present invention relates to an improved clamp for a key cutting machine.

BACKGROUND OF THE INVENTION

Key cutting machines, also commonly called duplicating machines, are well known. A known type of such machines comprises a base on which a feeler is mounted to mechanically sense the notches of the notching pattern of an original key to be duplicated, together with a milling cutter to form similar notches on a blank key to be cut.

On the same base a movable structure is also mounted supporting two clamps, to which the original key to be duplicated and the blank key to be cut are fixed. The arrangement of the parts is such that the two keys are disposed with the axes of their respective shanks parallel and that when the original key faces the feeler the blank key faces the cutter.

In this manner, by moving the movable structure such that the feeler slides along the pattern notches of the original key the cutter forms, on the blank key, notches which are substantially identical to those of the original key in terms of position and depth.

In another known type of duplicating machine the movement of the blank key to be cut relative to the cutter is obtained mechanically on the basis of notching pattern data contained in a database. In this case, cutting the blank key does not require the physical presence of the original key as the notching data can be read off at a prior moment by a device separate from the duplicating machine, or can be made available via a previously memorized notching code.

In all cases the blank key to be cut must at least be retained by a clamp in a position in front of a milling cutter and is moved relative to said cutter such that this forms in the key edge the notches corresponding to the notching pattern to be provided.

Known clamps generally comprise two jaws, between which the concerned key is clamped. These jaws are mounted on a generally vertical pin and are maintained spaced apart by a spring. The pin has its upper portion threaded and on this a knob is screwed, which when operated by the operator causes the two jaws to move towards each other and clamp the interposed key.

A drawback of known clamps of this type is that if the knob is too loosely tightened the key does not become securely fixed and can vibrate during milling, such that in some cases it can even become detached from the clamp. These is hence a risk of cutter breakage and in any event an imperfect notching result. If instead the knob is too tightly tightened, the clamp can undergo early wear and the key be damaged, especially if made of soft material such asaluminum.

To illustrate, U.S. Pat. No. 4,709,511, granted Dec. 1, 1987, discloses a clamp for duplicating machines for keys. The clamp includes a vertically extending pin (4) with a threaded upper end, a pair of jaws (1, 2) mounted on the pin, and supported on a support carriage (3), as shown in FIG. 1. A spring (6,8) or other resilient member normally biases, or spaces, the jaws apart so that a key may be positioned therebetween. Rotation of a handgrip (10) about the threaded upper of pin (4) overcomes the bias of the spring, and applies a clamping force to the key to retain same in fixed position in the slot formed between the jaws. A rib (12), or similar projection, is defined on the lower jaw, to provide a lever-like force that prevents the jaws from sticking together during the clamping phase, and overcomes difficulties in opening the jaws during the release phase of the cycle of operation.

U.S. Pat. No. 6,641,339, granted Nov. 4, 2003, discloses another clamp for a key duplicating machine. The clamp includes a pair of jaws (10,12) mounted on a vertically extending pin (6); the jaws are supported by base (2), which encircles the lower end of the pin. The jaws are normally biased apart by a coil spring or other resilient member, so that a key (14) may be inserted into the gap between the jaws. The jaws are mounted on the pin, and the upper end of the pin is threaded into engagement with handgrip (16). The handgrip, or knob, is screwed into the upper end of pin (6) to lock key (14), and jaws (10,12) to the base (2). A gauge (20) is operatively associated with the seat to define a proper position for the key.

Therefore, the prior art discloses clamps for key cutting machines, in which the clamping force delivered to the jaws, to maintain the keys in fixed position, was fixed in magnitude. The need for a clamp for key cutting machines, in which a constant key clamping force may be applied without the risk of damaging the key and/or the milling cutter, remains unsatisfied.

BRIEF SUMMARY OF THE INVENTION

An object of the invention is to eliminate this drawback by making the operation of fixing a key to the duplicating machine clamp independent of the operator's ability and experience.

This and further objects which will be apparent from the ensuing description are attained according to the invention by an improved clamp for key cutting machines hereinafter.

BRIEF DESCRIPTION OF THE DRAWINGS

A preferred embodiment of the present invention is further described hereinafter with reference to the accompanying drawings, in which.

Figure 1:
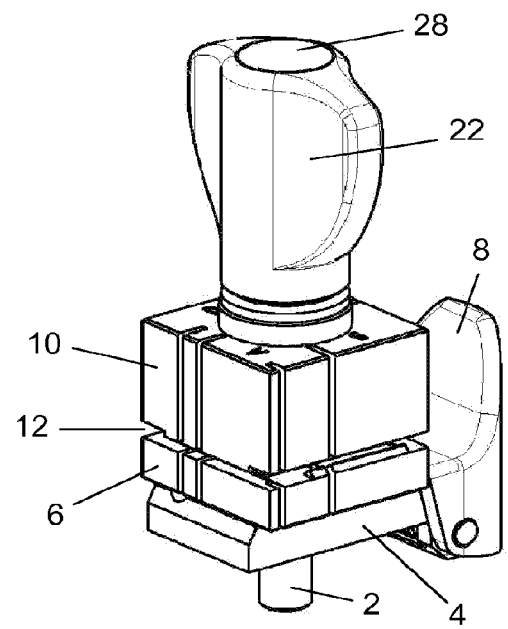
FIG. 1 is a perspective view of a clamp according to the invention.
Figure 2:
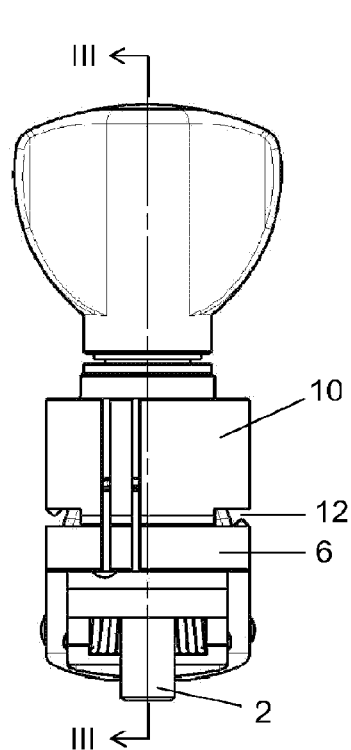
FIG. 2 shows the clamp in a frontal elevational view in the direction II-II of FIG. 3.

A detailed description of a preferred embodiment of the invention is provided hereinafter.

DETAILED DESCRIPTION OF A PREFERRED EMBODIMENT

As can be seen from the figures the clamp of the invention is applied to the structure of a duplicating machine, not shown in the drawings. It comprises a vertical pin 2, which is fixed to said structure and to which a base plate 4 is fixed, on which the square-based lower jaw 6 of the clamp rests.

A lever 8 is also applied to the base plate 4 and interacts with the fixed jaw 6 to enable the clamp to be positioned in four different angular positions rotated through 90° to arrange, in this manner, the clamp for fixing keys of different profiles, in accordance with traditional techniques which do not form an aspect of the present invention.

The clamp of the invention also comprises an upper jaw 10 which is also supported centrally by the pin 2 and together with the lower jaw defines four slots 12 for housing and fixing keys of different profiles.

Figure 3:
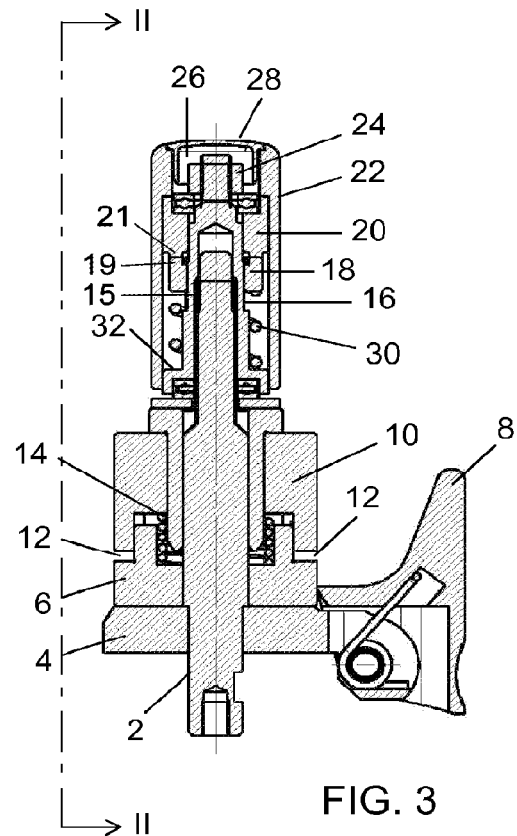
FIG. 3 is a vertical section therethrough on the line III-III of FIG. 2.

Between the two jaws 6 and 10 a coil 14 spring is disposed, as shown in FIG. 3, acting to maintain the upper jaw 10 spaced from the lower jaw 6 along the pin 2, thereby maintaining the four slots 12 open.

An exterior screw thread 15 is formed on the upper portion of the pin 2. An internally threaded sleeve 16 in the form of a cap is screwed onto thread 15. The extent of screwing cap 16 onto the pin 2 urges the upper jaw 10 to a greater or lesser extent towards the lower jaw 6 against the elastic reaction of the spring 14.

A first sleeve 18 is associated with cap 16, such that first sleeve 18 is free to slide axially along the cap, but is unable to rotate about it, and first sleeve 18 includes on its upper annular surface gear teeth 19, which engage in the inclined gear teeth 21 of second sleeve 20, which is joined with an operating knob 22. This knob 22 is fixed to the upper threaded portion of the cap 16 by a nut 24 housed in a cavity 26 provided in the top of the knob 22 and closed by a plug 28.

A coil spring 30 interposed between the sleeve 18 and a lower flange 32 of the cap 16 maintains the two frontal toothed portions of the sleeves 18 and 20 elastically coupled together.

The clamp of the invention operates in the following manner.

During preliminary setting, the nut 24 is screwed down to a greater or lesser extent to load the spring 30 to the value required for the reaction torque of the dynamometric or torque limiting device. Such device includes the spring 30 and the two sleeves 18, with gear teeth 19, 20 respectively, which are maintained coupled together by the spring.

After the pair of jaws 6, 10, maintained spaced apart by the spring 14, have been positioned on the pin 2 such as to make operative the chosen slot 12 corresponding to the key to be clamped, the key is positioned in the slot and the knob 22 operated. This action is transmitted via the dynamometric device to the cap 16, which is screwed onto the threads 15 of the pin 2 to cause the upper jaw 10 to approach the jaw 6 and hence clamp the key therebetween.

The intensity of this clamping is governed by the dynamic device. More specifically, after the upper jaw 10 has come into contact with the key, the reaction to further screwing of the cap 16 is controlled by the dynamic device. Until a certain value is obtained, the effect of the spring 30 prevails to maintain gear teeth 19 and 21 on sleeves 18, 20 coupled together, whereas when this value is exceeded, the inclined gear teeth 19, 21 of the sleeves 18 and 20 slide over each other without causing further rotation of the cap 16 and hence without providing a further clamping effect on the key.

In practice the torque transmitted by the knob 22 to the cap 16 and hence the intensity of the clamping on the key is related to the inclination of the teeth of the sleeves 18 and 20 and to the preload of the spring 30. The inclination of the teeth is evidently fixed, whereas the preload of the spring 30 can be adjusted by screwing the nut 24 to a greater or lesser extent along the upper threaded portion of the cap 16.

From the aforegoing it is apparent that the improved clamp according to the invention is particularly advantageous compared with traditional clamps for key cutting machines, in that it ensures a constant key clamping force without the risk of damaging the key and/or the milling cutter, independently of the ability and experience of the operator. Moreover it enables the value of this constant clamping force to be predefined, to adapt the clamp to the different possible key materials.

The invention claimed is:

1. A clamp for key cutting machines comprising:
    a pair of jaws mounted on a single pin fixed to a machine structure;
    a knob operatively coupled to said pin and causing said jaws to forcedly approach each other, against an elastic reaction of a first spring disposed between said jaws and tending to repel said jaws, said knob further causing said jaws to retain a key positioned between said jaws upon turning of said knob;
    a torque limiting device interposed between said knob and said pin;
    a cap disposed between said torque-limiting device and said laws, said cap being affixed to said pin and being further longitudinally slidable in relation to said torque-limiting device, said cap having a flange extending therefrom in proximity of said laws; and
    a second spring disposed between said torque-limiting device and said flange, said second spring exerting pressure both against said torque-limiting device and against said laws.

2. The clamp as claimed in claim 1, wherein said jaws are of square plan and are fixable to said pin in four positions angularly rotated by 90° to render operative each couple of facing sides of the jaws.

3. The clamp as claimed in claim 2, further comprising lever means to lock the pair of jaws in a desired annular position about said pin.

4. The clamp as claimed in claim 1, wherein said torque-limiting device comprises a lower and an upper sleeve, the lower sleeve being rotatably rigid with said pin, the upper sleeve being rotatably rigid with said knob, said lower and upper sleeves being provided with toothed portions maintained coupled together by said second spring and becoming decoupled when a predetermined torque is exceeded, by axial sliding of said lower sleeve relative to said upper sleeve and against an elastic reaction of said second spring.

5. The clamp as claimed in claim 1, wherein said cap is provided with a threaded portion on which a nut is screwed to fix said knob to said cap and to preload said second spring cooperating with said torque-limiting device.

6. The clamp as claimed in claim 5, wherein said preloading nut is housed in a cavity provided in said knob and closable by a plug.

7. A clamp adapted for use with a key cutting machine, said clamp comprising:
    a) a vertically extending pin having an upper end, a lower end, and an elongated shank, extending between said upper and lower ends,
    b) the lower end of said pin adapted to be secured to a key cutting machine,
    c) a lower jaw including a central aperture that fits over said shank, so that said lower jaw rests upon a base plate,
    d) an upper jaw including a central aperture that fits over said shank, so that said upper jaw is located above said lower jaw,
    e) a plurality of slots defined between said upper and lower jaws,
    f) first resilient means located around said pin and between said upper and lower jaws to bias the jaws apart and maintain the slots in opened condition,
    g) the exterior of said upper end of said shank of said pin being threaded,
    h) an internally threaded cap screwed onto the upper end of said shank,
    i) a flange defined at the lower end of said cap,
    j) a first sleeve configured to slide axially along the exterior of said cap,
    k) a plurality of teeth located on an upper surface of said first sleeve, l) a second sleeve located above said first sleeve on said shank,
m) a plurality of teeth located on said second sleeve facing said plurality of teeth on said first sleeve,
n) second resilient means disposed about said cap to urge said teeth on said first and said teeth on said second sleeves into engagement, said second resilient means exerting pressure against said jaws,
o) a downwardly opening knob that fits over said shank of said pin, said first and said second sleeves, said cap, and said second resilient means,
p) a nut secured to the upper threaded end of said cap to join said knob to said cap,
q) wherein said second resilient means comprises a spring disposed about said cap against said flange to bias the teeth on said first and second sleeves into engagement, and
r) said nut being adjusted along the upper end of said cap to vary pre-load on said spring,
s) whereby rotation of said knob transmits a clamping force to said upper jaw to maintain contact with a key retained in one of said slots until a pre-set value imparted by said spring is exceeded, and said teeth on said first and second sleeves slide in relation to each other.

* * * * *